(12) United States Patent
Dice et al.

(10) Patent No.: US 8,402,464 B2
(45) Date of Patent: Mar. 19, 2013

(54) SYSTEM AND METHOD FOR MANAGING CONTENTION IN TRANSACTIONAL MEMORY USING GLOBAL EXECUTION DATA

(75) Inventors: David Dice, Foxboro, MA (US); Mark S. Moir, Windham, NH (US)

(73) Assignee: Oracle America, Inc., Redwood City, CA (US)

( * ) Notice: Subject to any disclaimer, the term of this patent is extended or adjusted under 35 U.S.C. 154(b) by 1142 days.

(21) Appl. No.: 12/325,870

(22) Filed: Dec. 1, 2008

(65) Prior Publication Data

US 2010/0138841 A1    Jun. 3, 2010

(51) Int. Cl.
*G06F 9/46* (2006.01)
*G06F 9/50* (2006.01)

(52) U.S. Cl. .................................. 718/102; 718/108
(58) Field of Classification Search .......... 718/102, 718/107, 108
See application file for complete search history.

(56) References Cited

U.S. PATENT DOCUMENTS

| | | | |
|---|---|---|---|
| 5,428,761 A | 6/1995 | Herlihy et al. | |
| 6,385,715 B1 * | 5/2002 | Merchant et al. | 712/219 |
| 6,735,760 B1 | 5/2004 | Dice | |
| 6,785,803 B1 * | 8/2004 | Merchant et al. | 712/219 |
| 6,792,446 B2 * | 9/2004 | Merchant et al. | 718/108 |
| 6,862,664 B2 * | 3/2005 | Tremblay et al. | 711/137 |
| 6,886,081 B2 * | 4/2005 | Harres | 711/152 |
| 6,912,648 B2 * | 6/2005 | Hammarlund et al. | 712/219 |
| 6,952,764 B2 * | 10/2005 | Sager et al. | 712/218 |
| 7,219,349 B2 * | 5/2007 | Merchant et al. | 718/108 |
| 7,340,577 B1 * | 3/2008 | Van Dyke et al. | 711/169 |
| 7,346,747 B1 * | 3/2008 | Nussbaum et al. | 711/154 |
| 7,496,726 B1 * | 2/2009 | Nussbaum et al. | 711/163 |
| 8,117,403 B2 * | 2/2012 | Heller et al. | 711/150 |
| 8,171,491 B2 * | 5/2012 | Monnie et al. | 719/310 |
| 8,185,875 B2 * | 5/2012 | Kahlon et al. | 717/126 |
| 2001/0014905 A1 * | 8/2001 | Onodera | 709/102 |
| 2003/0126187 A1 * | 7/2003 | Won et al. | 709/107 |
| 2008/0005332 A1 * | 1/2008 | Pande et al. | 709/226 |
| 2008/0313645 A1 * | 12/2008 | Birrell et al. | 719/312 |

(Continued)

OTHER PUBLICATIONS

F.D. Munoz-Escoi, J. Pla-Civera, M.I. Ruiz-Fuertes, L. Irun-Briz, H. Decker, "Managing Transaction Conflicts in Middleware-based Database Replication Architectures", IEEE © 2006, 25$^{th}$ IEEE Symposium on Reliable Distributed Systems (SRDS'06), pp. 1-10.*

(Continued)

*Primary Examiner* — Aimee Li
(74) *Attorney, Agent, or Firm* — Robert C. Kowert; Meyertons, Hood, Kivlin, Kowert & Goetzel, P.C.

(57) ABSTRACT

Transactional Lock Elision (TLE) may allow threads in a multi-threaded system to concurrently execute critical sections as speculative transactions. Such speculative transactions may abort due to contention among threads. Systems and methods for managing contention among threads may increase overall performance by considering both local and global execution data in reducing, resolving, and/or mitigating such contention. Global data may include aggregated and/or derived data representing thread-local data of remote thread(s), including transactional abort history, abort causal history, resource consumption history, performance history, synchronization history, and/or transactional delay history. Local and/or global data may be used in determining the mode by which critical sections are executed, including TLE and mutual exclusion, and/or to inform concurrency throttling mechanisms. Local and/or global data may also be used in determining concurrency throttling parameters (e.g., delay intervals) used in delaying a thread when attempting to execute a transaction and/or when retrying a previously aborted transaction.

20 Claims, 4 Drawing Sheets

U.S. PATENT DOCUMENTS

2009/0070774 A1* 3/2009 Raikin et al. .................. 718/108

OTHER PUBLICATIONS

Ravi Rajwar, Maurice Herlihy, Konrad Lai, "Virtualizing Transactional Memory", IEEE © 2005, Proceedings of the 32$^{nd}$ International Symposium on Computer Architecture (ISCA'05), pp. 1-12.*

David Dice, et al., "Applications of the Adaptive Transactional Memory Test Platform," 2008, 10 pages.

Michael A. Bender, et al., Adversarial Contention Resolution for Simple Channels, SPAA 2005, ACM, 8 pages.

M. L. Scott and W. N. Scherer III, "Scalable Queue-Based Spin Locks with Timeout," 8th ACM PPoPP, 2001.

Herlihy, et al., "Transactional Memory: Architectural Support for Lock-Free Data Structures," Proc. 20th Annual International Symposium on Computer Architecture, pp. 289-300, May 1993.

Scherer, III, et al., "Advanced Contention Management for Dynamic Software Transactional Memory," Proc. of the 24th Annual ACM Symposium on Principles of Distributed Computing, 2005, pp. 240-248.

Guerraoui, et al., "Robust Contention Management in Software Transactional Memory," Proc. of the OOPSLA 2005 Workshop on Synchronization and Concurrency in Object-Oriented Languages, 2005.

Ansari, et al., "Adaptive Concurrency Control for Transactional Memory," 2008, 12 pages.

Attiya, et al., "Transactional contention management as a non-clairvoyant scheduling problem", ACM, 2006, pp. 308-315.

Rajwar, et al., "Speculative Lock Elision: Enabling Highly Concurrent Multithreaded Execution," Appears in the Proceedings of the 34th International Symposium on Microarchitecture (MICRO), Dec. 3-5, 2001, Austin, TX, 12 pages.

Rajwar, et al., "Transactional Lock-Free Execution of Lock-Based Programs," Appears in the Proc. of the 10th International Conf. on Architectural Support for Programming Languages and Operating Systems (ASPLOS), Oct. 6-9, 2002, San Jose, CA, 13 pages.

Martinez, et al., "Speculative Synchronization: Applying Thread-Level Speculation to Explicitly Parallel Applications," ASPLOS X 10;/02, San Jose, CA, 2002 ACM ISBN 1-58113-574-2/02/0010 . . . , 12 pages.

Hammond, et al., "Transactional Memory Coherence and Consistency," ISCA-31, 2004, 12 pages.

Posva, et al., "Speculative Locking—Breaking the Scale Barrier," JavaOne, Sun's 2005 Worldwide Java Developer Conference, 37 pages.

O. Agesen, et al., "An efficient meta-lock for implementing ubiquitous synchronization," ACM SIGPLAN International Conference on Object-Oriented Programming Systems, Languages and Applications (OOPSLA), 1999.

Dave Dice, "Implementing Fast Java Monitors with Relaxed-Locks," USENIX JVM'01, 13 pages.

Adam Welc, et al, "Transactional Monitors for Concurrent Objects," ECOOP'04, 24 pages.

Adam Welc, et al, "Transparently Reconciling Transactions with Locking for Java Synchronization," ECOOP'04, 26 pages.

Dice, et al., "Transactional Locking II," DISC 2006, 15 pages.

Wikipedia, "Carrier sense multiple access with collision detection," last updated Feb. 12, 2009, http://en.wikipedia.org/wiki/Carrier_sense_multiple_access_with_collision_detection, 2 pages.

Wikipedia, "Admission Control," last updated Dec. 14, 2008, http://en.wikipedia.org/wiki/Admission_control, 1 page.

Wikipedia, "Carrier sense multiple access with collision avoidance," last updated Feb. 14, 2009, http://en.wikipedia.org/wiki/Carrier_sense_multiple_access_with_collision_avoidance, 14 pages.

Keir Fraser, "Practical Lock-Freedom," Ph. D. Dissertation—King's College, Univerity of Cambridge, 2003. (Final version, Feb. 2004), 116 pages.

Wikipedia, "Truncated binary exponential backoff," last updated Apr. 13, 2008, http://en.wikipedia.org/wiki/Truncated_binary_exponential_backoff, 1 page.

U.S. Appl. No. 11/967,371, filed Dec. 31, 2007.

U.S. Appl. No. 12/327,659, filed Dec. 3, 2008.

U.S. Appl. No. 12/324,109, filed Nov. 26, 2008.

J. Mellor-Crummey and M. Scott, "Algorithms for scalable synchronization on shared-memory multiprocessors," ACM Transactions on Computer Systems, 9(1), 1991.

Lev, "PhTM: Phased Transactional Memory," Transact 2007, 11 pages.

Pang, et al., "Performance Evaluation of an Adaptive Backoff scheme for WLAN," Wireless Communications and Mobile Computing, 2004, 13 pages.

Yoo, et al., "Adaptive Transaction Scheduling for Transactional Memory Systems," Georgia Institute of Technology, CERCS;GIT-CERCS-07-04.

* cited by examiner

SYSTEM AND METHOD FOR MANAGING CONTENTION IN TRANSACTIONAL MEMORY USING GLOBAL EXECUTION DATA

BACKGROUND OF THE INVENTION

1. Field of the Invention

This invention relates generally to multithreaded computer systems, and more specifically to a system and method for mitigating contention between concurrent threads of execution using transactional memory.

2. Description of the Related Art

Due to the complexity and energy concerns of modem processors, traditional approaches to boosting CPU performance have become difficult and ineffective. Instead of attempting to drive up clock speeds, computer architects are increasingly turning to multi-threading techniques such as symmetric multi-threading or multi-core architectures. In order to leverage these new architectures, software engineers must write applications that execute using multiple concurrent threads of execution. Unfortunately, correct multi-threaded programming is notoriously difficult using traditional language constructs.

Shared-memory systems allow multiple threads to access and operate on the same memory locations. To maintain consistency, threads must often execute a series of instructions as one atomic block, or critical section. In these cases, care must be taken to ensure that other threads do not observe memory values from a partial execution of such a block. Traditional constructs, such as mutual exclusion and locks may be used by a thread to ensure correctness by excluding all other threads from concurrent access to a critical section. For example, no thread may enter a critical section without holding the section's lock. While it does, all other threads wishing to execute the critical section must await the lock's release and acquire it before proceeding.

The pitfalls of these constructs are numerous and well known. They include dead-lock, race conditions, priority inversions, software complexity, and performance limitations. Locking entire critical sections is a heavy-handed approach to concurrency control.

Alternatively, it may be possible to increase parallelism by allowing multiple threads to execute a critical section at one time if the executions do not rely on overlapping memory locations. This may increase performance and mitigate many of the pitfalls normally associated with traditional locking mechanisms. However, such interleaved executions are not guaranteed to be correct.

Transactional memory is a mechanism that can be leveraged to enable concurrent and correct execution of a critical section by multiple threads. Transactional memory allows a thread to execute a block of instructions as a transaction, that is, either completely and atomically or not at all. The instructions are executed and then either "committed", allowing the aggregate effect to be seen by all other threads, or "aborted", allowing no effect to be seen. A transaction that has committed successfully may be said to have "succeeded". Transactional lock-elision (TLE) is a technique that allows multiple threads to execute a critical section concurrently and transactionally without necessarily acquiring and holding a lock. It provides identical semantics to traditional mutual exclusion but allows threads to execute critical sections as transactions that can be aborted if a conflict occurs. Aborted transactions may be retried by the thread later.

Unfortunately, it is possible that repeated transactional aborts may lead to serious performance degradation. In the case of two or more concurrent transactions causing mutual aborts, the system could achieve even worse performance under a naïve or simplistic TLE policy than under traditional mutual exclusion.

SUMMARY

A system and method for active contention management in multi-threaded, transactional memory systems may improve system performance. In such a method or system, the execution of any transaction may be delayed dependent, at least in part, on global execution data. Various concurrency throttling mechanisms such as backoff schemes, k-exclusion, or group exclusion may be employed and their execution may be influenced by such global execution data. Delays may be applied to an initial attempt by a thread to execute a transaction and/or to any retries attempted after a given attempt. The attempt or retry of a transaction may also proceed using mutual exclusion instead of TLE (e.g. in the case of excessively high abort rates or other factors).

In order to make contention reduction decisions (e.g., whether to delay, by how much to delay, whether to execute using mutual exclusion, or selecting values for parameters governing concurrency throttling mechanisms), a contention management system may consider global execution data in addition to or instead of thread-local data. Global execution data, with respect to any given thread, may include any thread-local execution data of one or more other threads and/or derivatives thereof. In various embodiments, thread-local execution data for a given thread may comprise one or more of: transactional abort history, abort causal history, resource consumption history, performance history, transactional delay history, synchronization history, or other data associated with a transactional execution attempted or completed by that thread. Global data may include raw or derived thread-local data from one or more other threads and/or data derived from the aggregation of such thread-local data.

Thread-local and global data may be updated at any time by threads and/or other entities in various embodiments. For example, threads, or library functions invoked by threads, may update execution data after each failed or successful attempt to execute a transaction. This data may be stored locally to each thread or in a global location. In some embodiments, thread-local data may be aggregated locally (e.g., by a respective thread). In other embodiments, other software components (e.g. one or more contention managers) may aggregate thread-local information. A contention manager may expose aggregated data to other components. Alternatively, a contention manager may assist more directly in transaction scheduling by providing actionable contention reduction decisions, such as specific delay intervals to threads or other components, or alternatively, by performing a delay itself (e.g., holding off on scheduling or initiation of thread execution, or delaying before returning or responding to the thread that initiated the contention management action).

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF THE EMBODIMENTS

As used herein, the term critical section may refer to a code path or a set of program instructions protected by a given lock. For example, code within a Java™ "synchronized" block is one example of a critical section. In various embodiments, the techniques described herein may also be applied to critical sections that are dependent on multiple and/or dynamically determined locks. The concurrent execution of a critical section by multiple threads may lead to incorrect program behavior.

As used herein, the term lock may refer to a software or hardware implemented mechanism associated with a critical section which may be used to ensure mutual exclusion, that is, that two threads do not execute the section concurrently. In order to execute a critical section, a thread may acquire and hold an associated lock. A lock is just one common implementation of mutual exclusion, or pessimistic concurrency control. Though several embodiments described herein include such locks, it should be evident to those skilled in the art that the methods described may be equally applicable to other mechanisms of mutual exclusion, such as disabling interrupts, task switching, or priority based schemes.

As used herein, the term transaction may refer to a series of program instructions that may be executed together as an atomic operation. If the transaction succeeds (i.e. is successfully committed), then any resulting changes to shared memory may become visible to entities other than the actor. If a transaction does not succeed (i.e. is aborted), then the transaction attempt will have caused no change to any shared memory location.

As used herein, the term transactional lock elision (TLE) may refer to a technique that allows multiple threads to concurrently execute the same critical section, or critical sections dependent on the same lock, by using transactions. TLE may, in various embodiments, be implemented in hardware, software, or both. With TLE, any thread may speculatively execute a critical section as a transaction, without holding the corresponding lock. However, the thread may commit the transaction only if no other thread has modified a memory location read by the transaction or has read or modified a shared memory location modified by the transaction, thereby possibly causing the transaction to behave incorrectly. In such cases, the transaction may abort and the thread may attempt to execute the critical section again, either transactionally or using mutual exclusion. TLE may admit more potential parallelism than traditional locks since concurrent transactional executions of one or more critical sections dependent on the same lock may be able to proceed without conflict. TLE may also inter-operate safely with concurrent threads using mutual exclusion: a transactional attempt may fetch and examine a lock's metadata to determine if the lock is held by a another thread. If the lock is held by another thread, the transaction must not commit, and must instead abort itself. Additionally, transactions must track lock metadata during transactional execution. If a thread T1 attempts to elide a lock transactionally, but another thread T2 acquires the lock before the transaction commits, then T1 may detect the lock acquisition and abort the transaction. In this manner, transactional execution respects the integrity of traditional mutual exclusion.

TLE may be distinguished from speculative lock elision (SLE) in that TLE requires explicit recoding of existing lock sites to use transactions, such as by including checkpoint and commit instructions, to indicate the beginning and end of a given transaction. SLE may operate on code that is transaction unaware. Managed runtime environments such as Java™ Virtual Machines (JVMs) with just-in-time compilers (JITs) may transform existing synchronized blocks via TLE. Similarly, SPARC binaries that may call locking services in system modules via dynamic linking, may also benefit from TLE.

The use of TLE may mitigate some of the problems with traditional locks by allowing the programmer to balance software complexity with the potential for deadlock or priority inversion. For example, when using only classic coarse-grained mutual exclusion locks, a program might not scale up due to lock contention. Absent TLE, a programmer might resort to the use of more complex concurrency mechanisms, such as lock-free schemes or fine-grained locking. TLE may allow the programmer to use simple coarse-grained locking but to enjoy performance benefits associated with more complex concurrency schemes. The use of TLE may also improve performance in a multi-threaded system by increasing parallelism, allowing multiple threads to concurrently make progress over critical sections without waiting for locks. However, performance may degrade if aborts are frequent. Furthermore, in the case of mutual aborts, it may be possible that no thread successfully commits the transaction and the resulting performance may even be worse than that of a system using only traditional locks. In some embodiments, TLE may be disabled, so that performance is not made worse than the original locking code. However, disabling TLE implies foregoing the possibility of obtaining the performance benefits of successful TLE operation. It may therefore be desirable for a system to actively reduce contention among threads.

To reduce the probability of an abort, and more broadly, to improve the aggregate global throughput over a lock, a transactional memory system may employ various concurrency throttling mechanisms which may reduce the level of concurrency over a given lock. In some embodiments, this may be done by limiting the number of threads permitted to elide a given lock at any one time. For example, k-exclusion may be used, whereby only K threads are permitted to elide a lock concurrently. In another example, a group mutual exclusion algorithm may be used to control how many threads (and of which type) may elide a lock concurrently. In other words, in some embodiments, only a certain number of readers or writers may elide a lock at one time (e.g., a small number of writers may be allowed to perform concurrent updates to protected locations, while a larger number of readers may be allowed concurrent read access to protected locations). Other embodiments may employ a local backoff mechanism similar to that used in traditional networking protocols such as Ethernet or variations thereof. In such embodiments, if a transaction aborts, the thread may retry after a short delay interval. In some embodiments, the delay interval may be dependent on the number of prior attempts (or retries) of that same transaction by the thread. Employing such a delay may reduce concurrency over a lock by taking the aborting thread out of circulation. Doing so may allow other potentially conflicting threads to operate under conditions of lessened concurrency, presumably with lower odds of transactional data conflict and better odds of success and progress. If the transaction aborts again, the thread may increase the delay interval by a given factor and retry, effectively reducing the concurrency over the lock even further. While many of the embodiments described herein are directed to determining thread-specific delay intervals for backoff mechanisms dependent on global execution data, the techniques apply equally to determining various parameters of any other throttling mechanism (e.g. k-exclusion, group exclusion) using such data.

In some embodiments, as a last resort, the thread may revert to mutual exclusion and acquire the lock instead of transactionally eliding it. In a sense, the contention manager may downgrade execution from transactional mode to normal execution mode with traditional blocking mutual exclusion. This policy may in some embodiments provide starvation avoidance, since at least the lock holder is guaranteed to make progress. As contention and data conflict aborts tend to be bursty and episodic in nature, care should be taken, however, that this policy of resorting to mutual exclusion does not inadvertently induce the "lemming effect", whereby transiently or briefly reverting to mutual exclusion mode may cause a prolonged period during which subsequent lock invocations that could otherwise have completed transactionally may be forced to use mutual exclusion.

As noted above, applying a backoff-type mechanism to transactional memory may in some embodiments include computing an appropriate delay dependent on the number of aborted attempts the thread has made during its current encounter with a given lock. Embodiments may, however, use any thread-local data (e.g. any data directly relating to a thread's execution) in computing such a delay. Thread-local data used in determining an appropriate delay may include, but is not limited to, one or more of:

transactional abort history—the number of unsuccessful attempts the thread has made to execute certain transactions     transactional delay history—previously applied delay intervals, delay conditions, or other concurrency throttling mechanism parameters applied to/by the thread, such as a delay interval for backoff     abort causal history—the causes of the thread having aborted previous transactions, including interference, lack of hardware resources, etc. If interference is the cause, then the identity of threads that have caused the interference may also be included in the abort causal history.

resource consumption history—measures of the computing resources consumed by previous failed or successful transactions executed by the thread     performance history—measurements of the performance of the thread over a given period     synchronization history—current and/or previous participation in a synchronization mechanism (e.g., a k-exclusion algorithm)

Other metrics which may be observed from the perspective of a single thread but are not presented in this classification, may likewise be considered thread-local data, and may be used in computing an appropriate delay interval for the thread in addition to, or instead of, any of the metrics presented above. The thread-local execution history may include such data, which may be captured across one or more transactions.

Thread-local data may, in some embodiments, encompass not only raw observational data as outlined above, but also derived data. For example, derived data may include statistical summaries of execution history, such as the average number of CPU resources consumed by a thread's previous aborts on a given transaction, or the median number of attempts made by a thread to execute a particular critical section before succeeding. Derived data may also include probabilistic models. For example, thread-local derived data may include an indication of the probability of a transaction succeeding given a certain delay interval, or an indication of the distribution of such probabilities. Such probabilistic models may also be multivariate as a matter of natural extension.

In some embodiments, a given component or subcomponent may be charged with controlling access to local data. In such embodiments, the component may also be tasked with calculating derived local data from the raw local data. Calculation of derived data may be done "on-demand", that is, upon request by the thread and/or another component. In other embodiments, derived data may be produced at other times, such as during data insertion, during data updates, or in response to other transaction-related events (e.g., a transaction abort, commit, or retry, a change in available resources, etc.).

Various embodiments may use any of the raw or derived thread-local data described herein, or any other suitable thread-local data, to make lock eliding and/or delay decisions. Embodiments may also utilize global data when making these decisions. The term "global data", as used herein with respect to a given thread, may refer to data based, at least in part, on the local execution data of at least one other thread. For example, when using backoff, global data used in computing the delay interval for a given thread may include the value of the delay interval being used by one or more other threads.

Using only thread-local data, a delay computation may be oblivious to the "global" abort rate of the lock. For example, in embodiments in which timed backoff is used, the system may be more likely to encounter situations where the collective abort rate for a lock is very high, but the retry interval, after a simplistic backoff fails, is short. This may be because the thread-local abort rate observed by a given thread may agree only imperfectly with the aggregate abort rate. This problem may be avoided by making the delay interval a function of global data, such as the aggregate recent abort rate. For instance, if a thread T1 detects that other threads T2 and T3 have aborted on lock L while T1 was itself stalling after an abort on L, then T1 may increase its delay interval accordingly. This approach may provide better overall throughput over an elided lock as compared to a simple policy of a thread-local backoff mechanism. Likewise, other concurrency reduction techniques, such as k-exclusion or group exclusion may use global data in their implementations, and may also be controlled by one or more parameters derived from such global data.

In a more specific example, assume a Java™ virtual machine (JVM) where "L" points to an inflated lock containing a monitor-specific "JustArrived" field and "Self" is a thread-specific unique identifier. The following pseudo-code function illustrates one example of a backoff delay scheme that uses global data. The default in this example is a fixed delay, but as more threads arrive at the delay routine the delay for those newly arrived threads, and the threads already in the delay routine, increases. So while the arrival rate at the routine is increasing, the mechanism automatically reduces the egress rate.

```
StallAfterCoherenceAbort (Lock * L) {
// StallAfterCoherenceAbort( ) is invoked after experiencing a
TLE abort caused by concurrent
// interference
    void * x;
    L->JustArrived = x = Self ;
    D:Delay (SomeFixedDelay) ;
    MEMBAR #storeload
    int y = L->JustArrived ;
    if (x != y) {
        // More threads arrived during our delay -- increase the
        // delay duration.
        x = y ;
        goto D ;
    }
    // As an optional optimization set JustArrived to Self at egress.
    // This results in a slower trickle of thread departing from the
    // StallAfterCoherenceAbort( ) routine.
    L->JustArrived = Self ;
    return ;
}
```

The pseudo-code above is schematic. One skilled in the art will recognize that a wide variety of implementations are possible. For example, some embodiments may provide first-in-first-out (FIFO) ordering in and out of the call to StallAfterCoherenceAbort( ). In embodiments employing such a FIFO policy, the mechanism may also take thread priority into account, favoring the earlier release of higher priority threads. Finally, the illustrated embodiment uses so-called "global" spinning. In other embodiments, various local spinning techniques may be employed in lowering coherence traffic.

In addition to the raw and derived local execution data of other threads, global data used in making lock elision and/or delay decisions may also include data derived from an aggregation of local data from multiple threads. Analogously to derived local data, derived global data may, in various embodiments, include statistical summarizations and/or probabilistic models based at least in part on the local data of two or more threads. For example, derived global data used in computing a delay interval for a given thread may include the average delay interval used by the previous transactional attempts of two or more threads.

Global data may be aggregated, stored, and/or managed in a number of ways, in different embodiments. In one embodiment, threads may update a set of variables or data structures in globally available memory (i.e. global variables). These variables may hold raw and/or derived global data, in various embodiments. The responsibility for updating derived global data may rest with any number of threads. For example, in one embodiment, any number of individual threads may update a global memory location (e.g. updating a shared data structure or a totalThreads variable that indicates the total number of threads currently attempting to execute a certain critical section). Such updates may be done either directly by the one or more threads or by invocation of other components or libraries. In various embodiments, global data updates may take place at any time. For example, a thread may update global data after any transaction fails, succeeds, or is initiated.

In some embodiments, one or more components (e.g. contention managers) may be tasked with collecting raw and/or derived local data from multiple threads. In some embodiments, these components may use the collected data to derive more data (i.e. derived global data). Examples of derived global data may include the average delay interval last used by a certain set of threads in a backoff scheme, the number of threads waiting to obtain a given lock, a previous value of k in a k-exclusion scheme, etc. The components that collect and/or derive such data may in various embodiments make any of the raw and/or derived data available to the threads as global data, either through function calls or directly through shared memory locations.

In some embodiments, contention management mechanisms may include the use of sampling to reduce the overhead of collecting global metrics. Such embodiments may allow a predefined fraction of threads to update certain global variables and then may compensate for the sampling later. Extending the example above, if only half of the threads are permitted or configured to update a totalThreads variable, then the mechanism may assume that twice as may threads are actually executing the critical section than the number of threads indicated by the value of that variable. Other components, such as contention managers, may also utilize sampling. In various embodiments, sampling may be applied at the level of threads, critical sections, locks, transactions, or at other levels.

Figure 1:
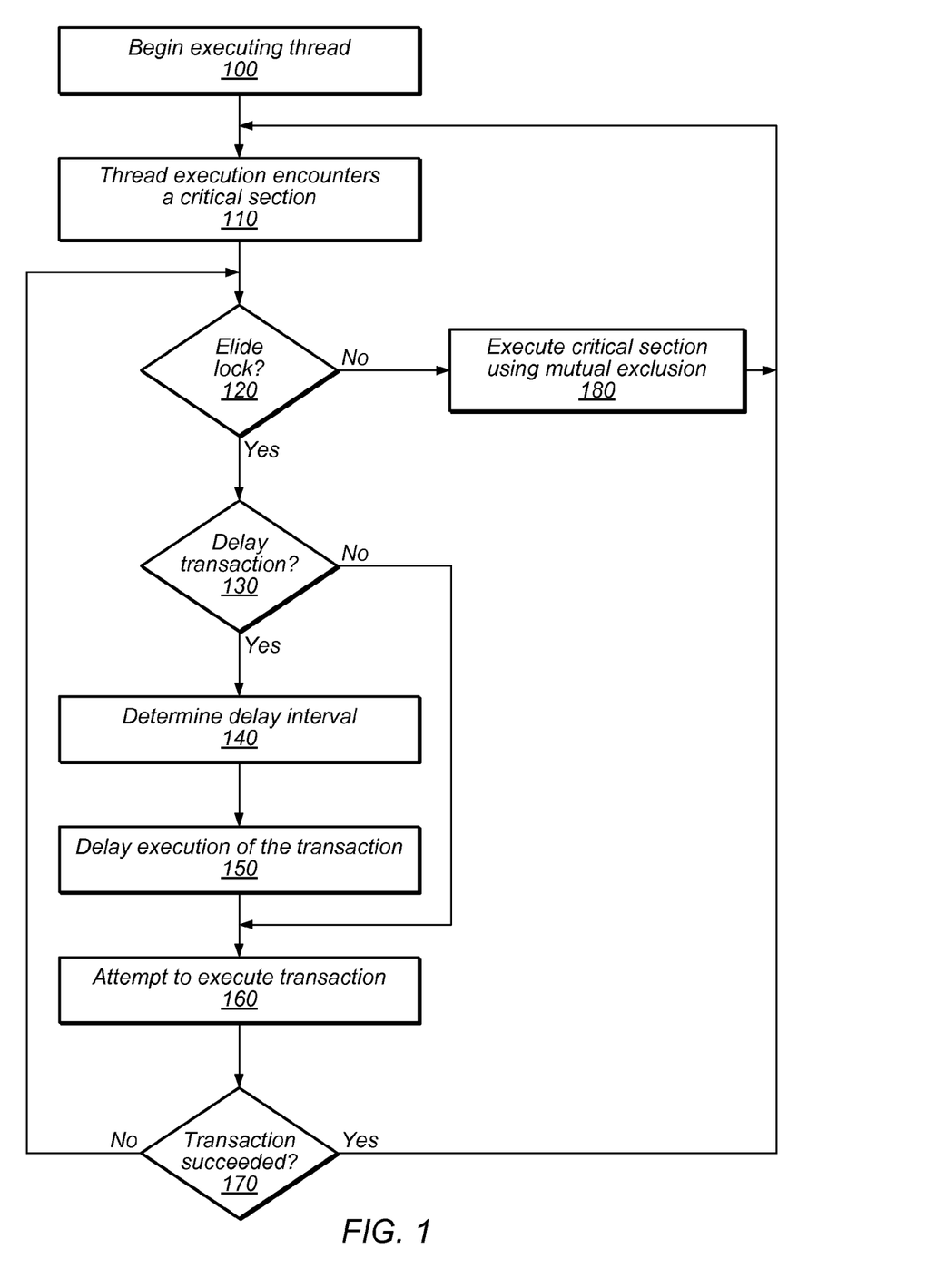
FIG. 1 is a flowchart illustrating one embodiment of a method of using global data to determine an appropriate interval by which to delay the execution of a given transaction by a thread.

As previously noted, a contention management mechanism that depends on global execution data may, in some embodiments, employ a backoff mechanism. FIG. 1 is a flowchart illustrating one embodiment of a method for executing a thread in a multi-threaded transactional memory system using a backoff mechanism. In the illustrated embodiment, the method includes beginning execution of a thread, as in 100, which proceeds until the thread encounters a critical section, as in 110. The thread may attempt to enter the critical section either by attempting to obtain the corresponding lock or by attempting to elide it. This determination, shown as 120, may be made in light of local and/or global data and may be made by one or more of: the thread, a shared library invoked by the thread, a contention manager, or any other software component, in different embodiments. Each determination 120-140 in the workflow illustrated in FIG. 1 may likewise be made via any combination of these entities. Each of the decisions may depend on various policies and/or be based on global data, thread-local data, or a combination thereof. If the thread executes using mutual exclusion, as in 180, then its eventual success may be guaranteed, for example, given that the application is free of deadlock and starvation. In this case, following execution of the critical section, thread execution may continue, as shown by the feedback from 180 to 110.

However, if the thread attempts to elide the lock (shown as the affirmative exit from 120), then a determination may be made to delay for a given interval, as in 130. Again, this decision may be determined by the thread and/or another component and may be based on local and/or global data. If it is determined that the thread should be delayed (shown as the affirmative exit from 130), then a delay interval may be determined, as in 140, by the thread and/or another component using local and/or global data. As shown in 150, execution of the transaction by the thread may be delayed for at least the determined interval, either by the thread itself or by another component, such as a thread scheduler. The thread may subsequently attempt to execute the transaction, as in 160. If the transaction aborts, shown as the negative exit from 170, then the thread and/or another component may reevaluate any number of the execution decisions 120-140, as shown by the feedback from 170 to 120 in FIG. 1. If the execution succeeds, then following execution of the critical section, thread execution may continue, as shown by the feedback from 170 to 110.

As noted above, the decision steps, illustrated in 120-140 of FIG. 1, may in various embodiments be dependent on thread-local data, global data, or a combination thereof. In some embodiments, these decisions may be made in a different order than illustrated in FIG. 1. For example, in one embodiment, determining a delay interval may only occur after a decision to elide a lock has been made. In another embodiment, the decision to delay may be combined with the determination of a delay interval length. In such an embodiment, a decision not to delay execution may be indicated by assigning a delay value of zero or some other sentinel value to the delay interval. In another embodiment, the decisions of 120-140 may be made between iterations of the workflow (120-170). In various embodiments, these decisions may be made by a current thread alone, by other components (such as one or more contention managers), or by a combination thereof.

In some embodiments, the decision steps illustrated in 120-140 may be executed on a first attempt by a thread to execute a transaction, though the thread may have never before attempted nor aborted the transaction. This may be desirable if a high degree of contention already exists on a lock when the thread first encounters it. For example, global data may indicate that there is already a high degree of contention on a critical section, and a long delay may be employed on the first attempt by the thread to execute the critical section. Alternatively, if global data indicates that many other threads are attempting to enter the critical section using mutual exclusion, then the thread may revert to mutual exclusion immediately, rather than potentially wasting system resources by repeatedly failing to execute transactionally.

Figure 2:
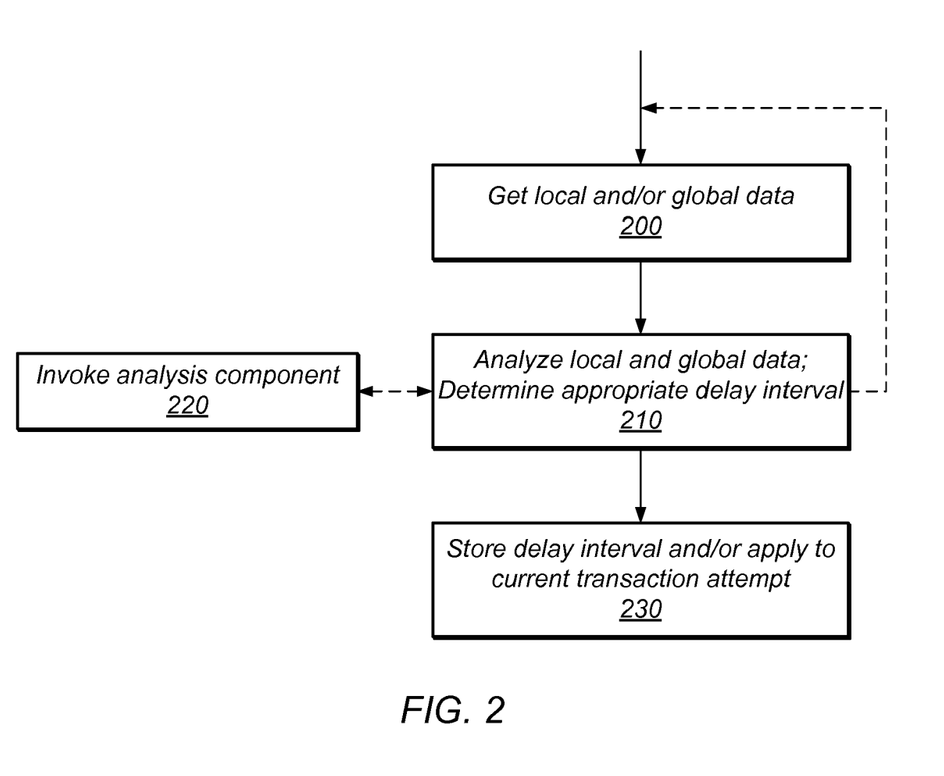
FIG. 2 is a flowchart illustrating one embodiment of a method of determining an appropriate interval by which to delay execution of a thread, as described herein.

FIG. 2 is a flowchart illustrating a method for a thread to determine a delay interval (e.g., as in 140 of FIG. 1), according to one embodiment. A similar process may be used for any of the decision steps 120-140 of FIG. 1, including a determination to execute using mutual exclusion or to delay a transaction at all. In this example, the method may begin by fetching local and/or global execution data, as in 200. This data may be used to determine the delay interval or to make another determination (e.g. whether to execute using mutual exclusion). As previously noted, the data fetched may include raw and/or derived data, in different embodiments. The local execution data fetched in step 200 may, in some embodiments, be directly accessible to a thread through local memory. In other embodiments, a given component or subcomponent may be charged with controlling access to local data.

Once the relevant data has been fetched (as in 200), a data analysis phase (shown as 210) may include determining a delay or make other decisions about the execution of the current thread, such as those depicted in steps 120-140. The data analysis may be based on the fetched global and/or on local data. In one embodiment, the thread itself may perform the needed analysis. For example, a thread may fetch global data, combine it with local data, and determine a delay interval to be used in attempting to execute a transaction. In another embodiment, the thread may fetch the necessary data and may invoke one or more analysis components, as in 220, any number of times to perform the necessary computation. In such an embodiment, any or all of the collected data may be provided to the analysis component(s) by one or more of passing a copy of the data, passing a reference to the data, or storing the data in shared memory. In still other embodiments, the thread may avoid fetching or requesting any raw or derived global data, but may instead request an actionable decision or set of decisions from a separate component (e.g., a contention manager). In such an embodiment, the thread may invoke one or more functions of another component (e.g. a contention manager), passing relevant local information to the function(s), and may receive actionable decisions from the function(s). For example, the thread may receive a delay interval value from the other component, or a Boolean value indicating whether to execute a particular transaction using mutual exclusion. Alternatively, the other component may itself perform the delay. For example, a contention manager may expose a function that, when invoked, does not return control to the thread until one or more conditions have been met (e.g. an interval of time has passed in a backoff scheme or the number of active threads executing a critical section has fallen below k, in a k-exclusion scheme). An invocation of the analysis component may not require any local or global data at all; rather, the analysis component may fetch all necessary data directly on invocation.

In various embodiments, the analysis phases illustrated in 210 and 220 may be repeated multiple times to gather more data and/or may make multiple decisions based on data fetched only once. The results of the analysis done in 210-220 (e.g., a delay interval value) may in various embodiments be stored in memory, as in 230, and/or otherwise provided to the thread and/or a contention management mechanism for application to the current attempt to execute a given transaction by the thread. In some embodiments, the determined delay interval may also be employed in a subsequent attempt by the thread to execute the same transaction, or in one or more attempts to execute a different transaction. In some embodiments, the determined delay interval may also be employed in attempting to execute other transactions by one or more other threads.

In some embodiments, not every decision or iteration of the backoff workflow depicted in FIG. 1 may require a fresh fetch of local and/or global data. For example, in one embodiment, the thread may cache data in local memory and reuse it to make decisions in subsequent iterations. In another embodiment, the data may be used to make inter-iteration decisions. For example, some embodiments may allow a thread or other component to determine a delay schedule and/or a maximum retry count based on global and/or local data and may apply them to subsequent iterations of the backoff loop. During subsequent iterations, the thread may only need to reference the schedule of decisions rather than to re-gather and/or re-analyze relevant execution data. Policies may also be pre-determined or partially pre-determined, in various embodiments. For example, in one embodiment, threads may be configured to always execute transactionally and without delay upon the first attempt to execute a critical section, and the methods described herein for determining whether to delay execution, for determining a delay interval, and/or for determining whether to resort to mutual exclusion may only be performed following at least one failure to execute the transactionally and without delay.

Figure 3:
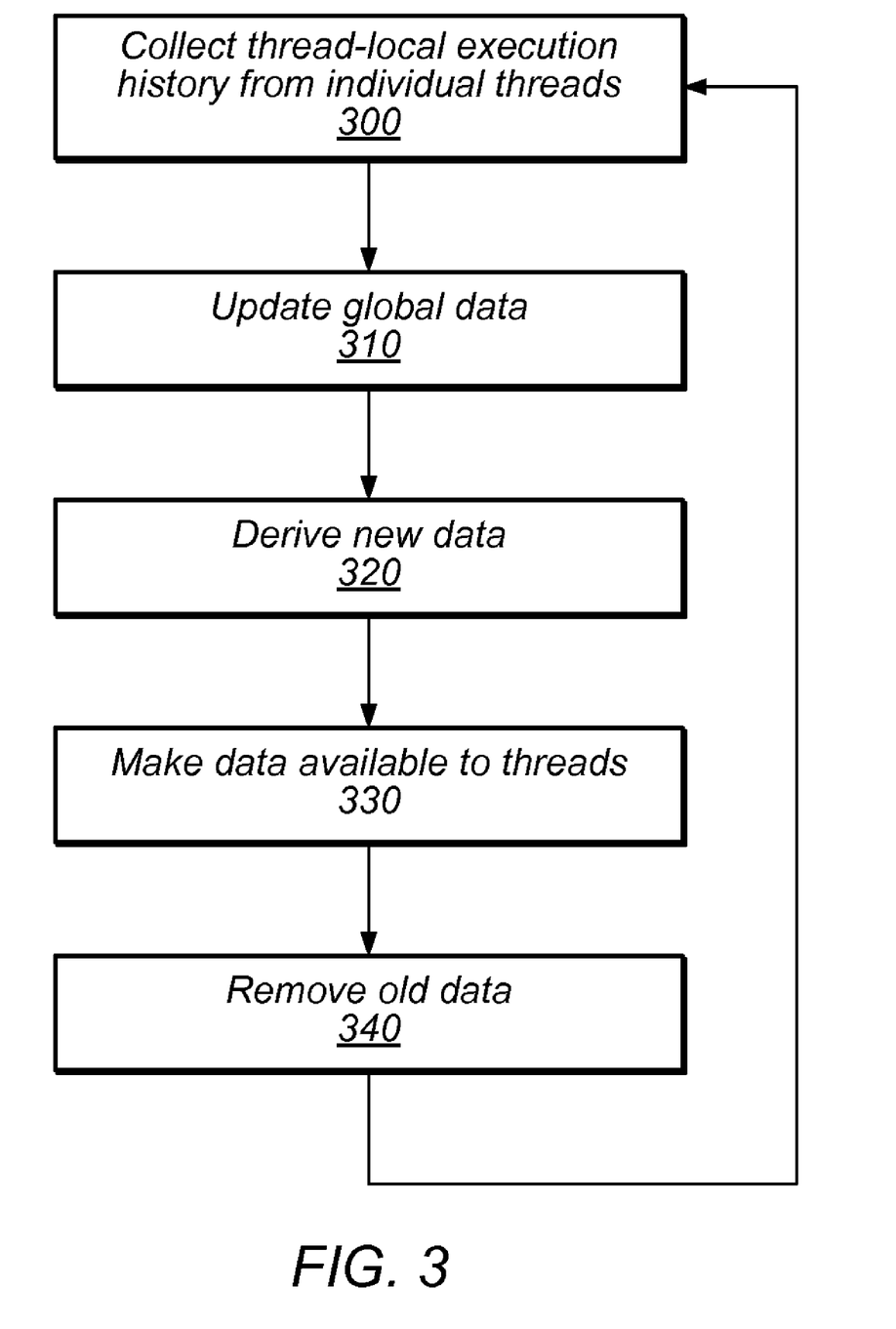
FIG. 3 is a flowchart illustrating one embodiment of a method of aggregating data associated with the execution histories of multiple threads, as described herein.

In various embodiments, a global contention manager may be tasked with the responsibility for collecting, deriving, and\or distributing execution data. FIG. 3 is a flowchart illustrating one embodiment of a method for gathering, deriving, and distributing global execution data using a contention manager. In the illustrated embodiment, a contention manager component may collect local data from one or more individual threads (as in 300), update the global data (as in 310), derive new data (as in 320), make that data available to one or more threads (as in 330), and remove or archive old execution data (as in 340), before returning to the collection phase, shown as the feedback from 340 to 300. It should be noted that, in other embodiments, any of the operations illustrated in FIG. 3 may be reordered or omitted, or other operations may be added. In still other embodiments, some or all of the operations may be performed only in a subset of iterations or may be performed between loop iterations. For example, removal of old data, as in 340, may not be performed at all, or may be executed for only a fraction of iterations, in different embodiments.

A contention manager may gather data from threads (as in 300) through a push or pull mechanism in different embodiments. For example, in an embodiment using a push scheme, the threads may push their local execution information to the contention manager either by updating shared memory locations or by invoking functions exposed by the manager. An embodiment utilizing a pull scheme may allow the contention manager to pull execution data from threads at various intervals. In various embodiments, this pulling may be performed by the contention manager accessing the shared memory locations where threads store local data, by invoking functions exposed by threads, or by any other communication or synchronization mechanism. Some embodiments may use a combination of these techniques. Both pull and push schemes may also be amenable to sampling, as discussed above.

After gathering relevant data, the contention manager may then use the data to update any number of aggregate metrics (i.e., global data), as in 310. In some embodiments, the contention manager may collect and, in some cases, aggregate local data from multiple threads in step 300 before using it to update the aggregate data in step 310.

In this example, the contention manager may derive global metrics from the collected local and/or global data, as in 320. In some embodiments, the contention manager may calculate derived thread-local metrics based on raw local data in order to unburden the local threads from that responsibility. In some embodiments, certain global metrics may only be derivable once a given number of relevant samples have become known. In one example, an average delay interval may not be calculated until delay interval values for at least two relevant threads are known. In another example, a probabilistic model may only be derived once a certain number of samples are known.

The contention manager may make relevant data (e.g., any or all of the collected or derived global or local data) available to the threads, as in 330. In various embodiments, the contention manager may deliver data to the threads using mechanisms analogous to those described above for data collection. These mechanisms may include any combination of shared memory mechanisms (e.g., global variables) or function calls in either a push or pull scheme.

Note that in some embodiments, there may be more than one contention manager. For example, in one embodiment, a separate contention manager may exist for each lock. In other embodiments, multiple contention managers may be structured hierarchically. In one such embodiment, thread-local contention managers may interact with lock-specific managers, which may interact with a global manager. Any number of contention management tiers may be implemented, in different embodiments.

In embodiments employing multiple contention managers, it may be possible to decentralize the collection and distribution of global contention data. In one such embodiment, local contention managers may request or directly access data from other contention managers at any level of the hierarchy. This may allow for the collection and distribution of execution data without the need for a single centralized manager or other single point of system centralization.

As noted above, a contention manager may deliver global data and/or actionable decisions to threads using any of the previously described push, pull, and shared memory mechanisms, in different embodiments. For example, in some embodiments, a contention manager may calculate contention decisions and/or derived metrics on demand (e.g. in response to a request by a thread) while in others, the contention manager may pre-calculate decisions and/or derived metrics and may store the results for subsequent use. Storing results may be particularly useful should a given contention decision or derived metric be applicable to more than one thread. For example, a contention manager controlling a lock may determine a standard delay interval for any transaction attempting to execute a corresponding critical section, based on observed and/or derived global data. In another embodiment, if a contention manager observes that TLE on a given lock fails frequently or is otherwise unbeneficial to performance, it may disable elision attempts at either the locking site or for that lock altogether. In another scenario, a contention manager may determine that a given proper or improper subset of threads desiring to enter the critical section should attempt to do so transactionally, even if a decision to execute using mutual exclusion has already been made. In this manner, a contention manager may mitigate the "lemming effect," whereby excessive contention causes many transactions to revert to mutual exclusion.

In addition to calculating a delay duration, a contention manager may utilize global data to facilitate k-exclusion policies. For example, to restrict transactional concurrency over a lock a contention manager may transparently impose k-exclusion, where the K value is computed using global data in order to maximize aggregate throughput over critical sections protected by the elided lock. Only K threads would be allowed to attempt TLE for a given lock at any one time, and the remainder would stall or block at the critical section entry point. The general concept of improving aggregate throughput over an elided lock by restricting concurrency over it when excessively high conflict abort rates are observed, is similar to that of the "admission control" problem in networking.

In some embodiments, it may be possible for a contention manager to take contention-mitigating action beyond passing information to concurrently executing threads. For example, in some embodiments, if TLE on a particular critical section is consistently unprofitable, the section, or the locking mechanism controlling it, may be dynamically recompiled to remove the TLE checks altogether and to revert to mutual exclusion (e.g., by transforming instructions or by conditional compilation of different groups of instructions). The dynamic recompilation may occur in response to a decision by the contention manager or by another component with access to the contention manager, or in response to detecting one or more particular values in the local or global data gathered. In this manner, subsequent attempts to execute the critical section may avoid any overhead associated with dynamic TLE operations. In some embodiments, it may be possible for the contention manager to interact with a thread scheduler to force a thread to block (i.e. to suspend execution and give up the processor) rather than spin (i.e. keep the processor but make no progress). While a thread blocks, it may surrender the processor and allow other threads to make progress. This may be desirable, for example, if the calculated delay is longer than the remainder of the time slice on the processor that is currently allocated to the thread. In alternative embodiments, the contention manager may pass information to the thread indicating that it should voluntarily block and give up the processor.

Figure 4:
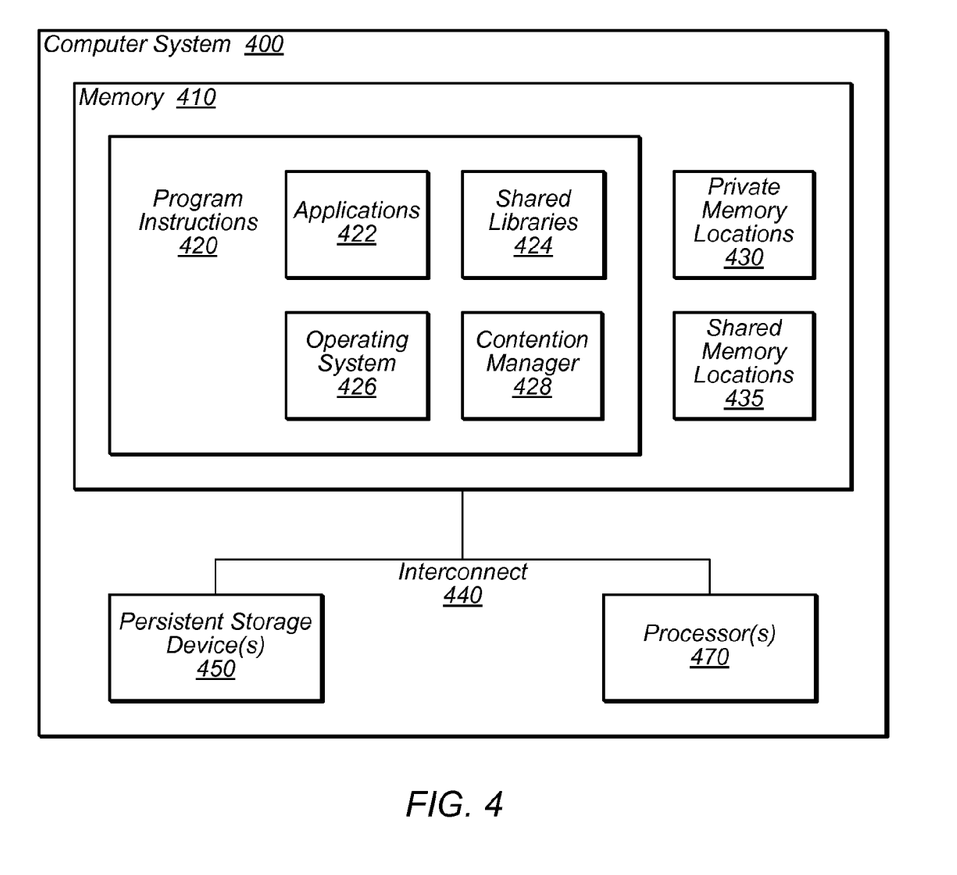
FIG. 4 is a block diagram illustrating an exemplary computer system configured to implement contention management in a transactional memory, according to various embodiments.

FIG. 4 illustrates a computing system configured to implement the methods described herein, according to various embodiments. The computer system 400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The contention management mechanisms described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 400 may include one or more processors 470, each may include multiple cores, any of which may be single or multi-threaded. The computer system 400 may also include one or more persistent storage devices 450 (e.g. optical storage, magnetic storage, hard drive, tape drive, solid state memory, etc) and one or more memories 410 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 4 (e.g., video cards, audio cards, additional network interfaces, peripheral devices, a network interface such as an ATM interface, an Ethernet interface, a Frame Relay interface, etc.)

The one or more processors 470, the storage device(s) 450, and the system memory 410 are coupled to the system interconnect 440. One or more of the system memories 410 may contain program instructions 420. Program instructions 420 may be executable to implement one or more applications 422, shared libraries 424, operating systems 426, or contention managers 428, as described herein. Program instructions 420 may be encoded in platform native binary, any interpreted language such as Java™ byte-code, or in any other language such as C/C++, Java™, etc or in any combination thereof The program instructions 420 may include transactional memory support configured to provide functions, operations and/or other processes for implementing memory contention management as described herein. Such support and functions may exist in one or more of the shared libraries 424, operating systems 426, contention managers 428, or applications 422. The system memory may further comprise private memory locations 430 and/or shared memory locations 435 where data may be stored. For example, these locations may in various embodiments store global and/or local execution data, derived local and/or global data, one or more calculated delay values, and/or values indicating actionable contention management decisions, as described herein.

Although the embodiments above have been described in considerable detail, numerous variations and modifications will become apparent to those skilled in the art once the above disclosure is fully appreciated. For example, although many of the embodiments are described in terms of TLE, it should be noted that the techniques and mechanisms disclosed herein may be applicable in other contexts in which transactions are used. One example may be supporting programming languages that provide atomic blocks implemented as transactions. It is intended that the following claims be interpreted to embrace all such variations and modifications.

What is claimed:

1. A computer-implemented method, comprising:
    initiating execution of a thread comprising a transaction involving a shared resource in a multi-threaded, transactional memory system;
    delaying, for an interval determined according to a concurrency throttling mechanism, an attempt by the thread to execute the transaction, wherein said interval is determined dependent, at least in part, on global execution data with regard to transaction attempts involving said shared resource by a plurality of threads, wherein the global execution data is dependent on respective local execution histories of the plurality of threads with regard to said shared resource; and
    the thread attempting to execute the transaction subsequent to said interval.

2. The method of claim 1, wherein said delaying and said attempting are performed in response to a failure of a previous attempt by the thread to execute the transaction.

3. The method of claim 1, wherein the local execution history comprises data derived from one or more of: transactional abort history, abort causal history, resource consumption history, performance history, synchronization history, or transactional delay history.

4. The method of claim 1, wherein the concurrency throttling mechanism comprises a backoff mechanism, the method further comprising:
    determining a backoff delay interval to be used by the backoff mechanism, dependent on the global execution data.

5. The method of claim 1, further comprising:
    updating the global execution data dependent on results of said attempting.

6. The method of claim 1, further comprising:
    in response to said attempting resulting in an abort of the transaction, retrying the transaction.

7. The method of claim 1, wherein said attempting comprises:
    determining an execution mode dependent, at least in part, on the global execution data; and
    executing the transaction using the execution mode;
    wherein the execution mode comprises one of: transactional lock elision or mutual exclusion.

8. A system comprising:
    one or more processors; and
    a memory coupled to the one or more processors and storing memory instructions executable by one or more processors to implement:
        initiating execution of a thread comprising a transaction involving a shared resource in a multi-threaded, transactional memory system;
        delaying, for an interval determined according to a concurrency throttling mechanism, an attempt by the thread to execute the transaction wherein said interval is determined dependent, at least in part, on global execution data with regard to transaction attempts involving said shared resource by a plurality of threads, wherein the global execution data is dependent on respective local execution history of at least one other thread, wherein said local execution history is local execution histories of the plurality of threads; and the thread attempting to execute the transaction subsequent to said interval.

9. The system of claim 8, wherein said delaying and said attempting are performed in response to a failure of a previous attempt by the thread to execute the transaction.

10. The system of claim 8, wherein the local execution history comprises data derived from one or more of: transactional abort history, abort causal history, resource consumption history, performance history, synchronization history, or transactional delay history.

11. The method of claim 8, wherein the concurrency throttling mechanism comprises one of: a backoff mechanism, k-exclusion, or group exclusion.

12. The system of claim 8, wherein program instructions are further executable to implement:
updating the global execution data dependent on results of said attempting.

13. The system of claim 8, wherein program instructions are further executable to implement:
in response to said attempting resulting in an abort of the transaction, retrying the transaction.

14. The system of claim 8, wherein said attempting comprises:
determining an execution mode dependent, at least in part, on the global execution data; and
executing the transaction using the execution mode;
wherein the execution mode comprises one of: transactional lock elision or mutual exclusion.

15. A non-transitory computer readable storage medium storing computer-executable program instructions to implement:

initiating execution of a thread comprising a transaction involving a shared resource in a multi-threaded, transactional memory system;
delaying, for an interval determined according to a concurrency throttling mechanism, an attempt by the thread to execute the transaction, wherein said interval is determined dependent, at least in part, on global execution data with regard to transaction attempts involving said shared resource by a plurality of threads, wherein the global execution data is dependent on respective local execution histories of the plurality of threads with regard to said shared resource; and
the thread attempting to execute the transaction subsequent to said interval.

16. The non-transitory storage medium of claim 15, wherein said delaying and said attempting are performed in response to a failure of a previous attempt by the thread to execute the transaction.

17. The non-transitory storage medium of claim 15, wherein the local execution history comprises data derived from one or more of: transactional abort history, abort causal history, resource consumption history, performance history, synchronization history, or transactional delay history.

18. The non-transitory storage medium of claim 15, wherein the program instructions are further executable to implement:
updating the global execution data dependent on results of said attempting.

19. The non-transitory storage medium of claim 15, wherein the program instructions are further executable to implement:
in response to said attempting resulting in an abort of the transaction, retrying the transaction.

20. The non-transitory storage medium of claim 15, wherein said attempting comprises:
determining an execution mode dependent, at least in part, on the global execution data; and
executing the transaction using the execution mode;
wherein the execution mode comprises one of: transactional lock elision or mutual exclusion.

* * * * *